April 29, 1930. P. FUNKE 1,756,735
PISTON COOLING DEVICE FOR INTERNAL COMBUSTION ENGINES
Filed Dec. 19, 1928
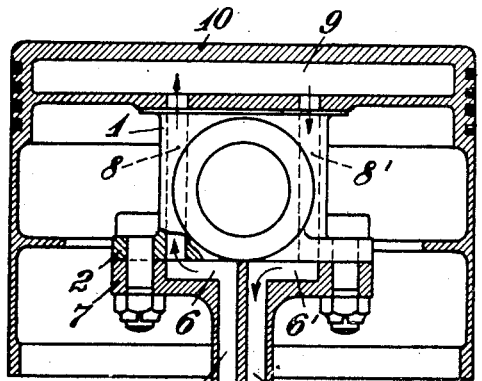
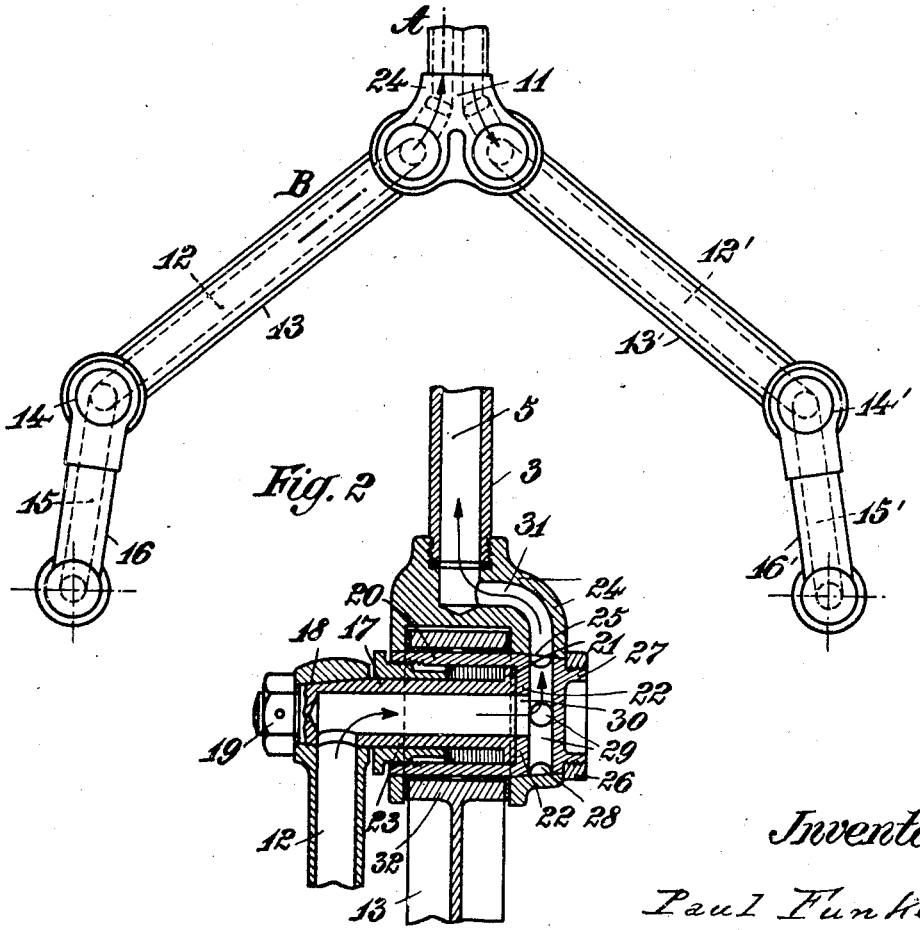

Patented Apr. 29, 1930

1,756,735

UNITED STATES PATENT OFFICE

PAUL FUNKE, OF BERLIN-SCHOENEBERG, GERMANY

PISTON-COOLING DEVICE FOR INTERNAL-COMBUSTION ENGINES

Application filed December 19, 1928, Serial No. 327,118, and in Germany January 7, 1928.

My invention relates to an arrangement intended to cool the pistons of internal combustion engines in which the cooling means is supplied to the piston and led off therefrom by means of articulated tubes.

In devices of this type hitherto it was usual to arrange the inlet and outlet tubes separate from one another, as this measure considerably facilitates the connection of the cooling device with the crank casing and its accessibility and survey during operation. Besides these advantages this construction however suffers from the serious drawback of the tubes rigidly connected to the piston frequently breaking, as they are subjected to a permanent one side stress by the forces generated by the friction and the masses of the swinging articulated tubes. My invention has for its object to overcome this drawback which object is obtained by the articulated tubes that supply and lead away the cooling means being connected symmetrically to a twin tube rigidly mounted on the piston. This design results in the fact that the friction and mass forces generated by the swinging articulated tubes and acting upon said twin tube neutralize one another.

In order to allow of my invention to be more easily understood, a preferred embodiment of same is illustrated by way of example in the drawing which accompanies and forms part of this specification. In this drawing Figure 1 is a view of the whole cooling arrangement, the piston and the twin tube fixed thereon being shown in section, and Figure 2 is a section on line A—B of Figure 1.

Referring to these figures, 1 denotes one of the piston eyes serving to lodge the pin connecting the connecting rod (not shown) to the piston. This eye carries a flange 2 on which a twin tube 3 is applied by means of a suitable flange 7 and the partition 4 of which closely abuts on flange 2. The two channels 5 and 5' of the twin tube 3 communicate through short passages 6, 6' provided in flange 7 with vertical passages 8, 8' provided in the eye 1 which passages lead to the cooling chamber 9 of the front portion 10 of piston 1.

By means of a twin joint 11 articulated tubes 12, 12' are connected to the twin tube 3 which tubes are supported by solid articulated links 13, 13'. To the latter are connected single articulated tubes 15, 15' and single supporting links 16, 16' by means of single joints 14, 14'.

Figure 2 illustrates the construction of the twin joint 11. The respective articulated tube 12 opens into a hollow pin 17 which is open on the opposite end and rigidly connected on its closed end to tube 12 by its tapering extremity 18 and a tightening screw 19. The pin 17 is rotatably lodged in a sleeve 20 and abuts with a flange 21 on an internal flange 22 of sleeve 20, a stuffing box 23 tightening the two parts to one another. The sleeve 20 is rigidly mounted in a bifurcated head or casing 24 fixed on the twin tube 3, Figure 1. As to be seen from Figure 2, sleeve 20 has a tapering right-hand end portion 25 which fits in a corresponding bore of head 24, the parts being tightened by an annular nut 26 that engages a threaded extension 27 of sleeve 20. The portion 25 of sleeve 20 has cut into it an annular groove 28 which through radial bores 29 that cross each other and through an axial bore 30 communicates with the interior of pin 17. The annular groove 28 of sleeve 20 communicates through a passage 31 of casing 24 with the channel 5 of the twin tube 3.

The other half of the twin joint is designed in an analogous manner to lead off the cooling liquid through the channel 5' of the twin tube 3 and through tube 12'. The single joints 14, 14' are likewise constructed in the described manner. The way of the cooling means is indicated by arrows.

The described disposition of the articulated tubes results in the fact that all forces that act upon the twin tube 3 in the plane of the articulated tubes compensate one another.

Besides these forces however further forces exist due to the articulated tubes extending in another vertical cross plane than the twin tube 3 which forces act normally to the plane of the articulated tubes. In order to eliminate also these forces, the articulated tubes are completely relieved thereof by the above mentioned special rigid links 13, 13' and 16, 16' being disposed in the plane of the twin tube 3. Figure 2 illustrates the manner in which the links 13 are connected to the twin joint 11, an analogous connection being provided between the links 16, 16' and the single joints 14, 14'.

As to be seen from Figure 2, the link 13 embraces by an eye 32 the sleeve 20 of pin 17, this eye being situated between the two bearing eyes of head 24, so that the link 13 extends in the same plane as the twin tube 3.

The described disposition of additional supporting links affords the advantage of the articulated tubes and the twin tube being protected from all stresses due to the friction and the masses of the swinging parts. My improved cooling device therefore is adapted to be applied on internal combustion engines running at the highest rates of speed.

What I claim and desire to secure by Letters Patent, is:—

1. In an internal combustion engine a twin tube fixed on the piston and communicating with the cooling chamber thereof, a twin casing mounted on the free end of said twin tube, two bearing sleeves symmetrically arranged in said casing normally to the direction of motion of said piston, a hollow pin lodged in each of said sleeves, two passages in said casing each connecting one of said hollow pins to one tube of said twin tube, an articulated tube conductively connected to each of said hollow pins, and means for relieving said articulated tubes from additional stresses.

2. In an internal combustion engine a twin tube fixed on the piston and communicating with the cooling chamber thereof, a twin casing mounted on the free end of said twin tube, two bearing sleeves symmetrically arranged in said casing normally to the direction of motion of said piston, a hollow pin lodged in each of said sleeves, two passages in said casing each connecting one of said hollow pins to one channel of said twin tube, an articulated tube conductively connected to each of said hollow pins, and links hingedly connected to said casing about said bearing sleeves and to said articulated tubes about the fulcrums thereof and extending in the plane of said twin tube.

3. In an internal combustion engine a twin tube fixed on the piston and communicating with the cooling chamber thereof, a twin casing mounted on the free end of said twin tube, a pair of bearing eyes symmetrically arranged on each half of said casing with their axis normal to the direction of motion of said piston, a bearing sleeve mounted in each of said pair of eyes, a hollow pin lodged in each of said sleeves, two passages in said casing each connecting one of said hollow pins to one channel of said twin tube, an articulated tube conductively connected to each of said hollow pins, and links hingedly connected to said casing about said bearing sleeves between said bearing eyes and to said articulated tubes about the fulcrums thereof and extending in the plane of said twin tube.

In testimony whereof I affix my signature.

PAUL FUNKE.